Aug. 26, 1930.  H. W. JOHNSON  1,774,378
AUTOMOBILE LICENSE PLATE HOLDER AND PARKING INDICATOR
Filed Sept. 10, 1927
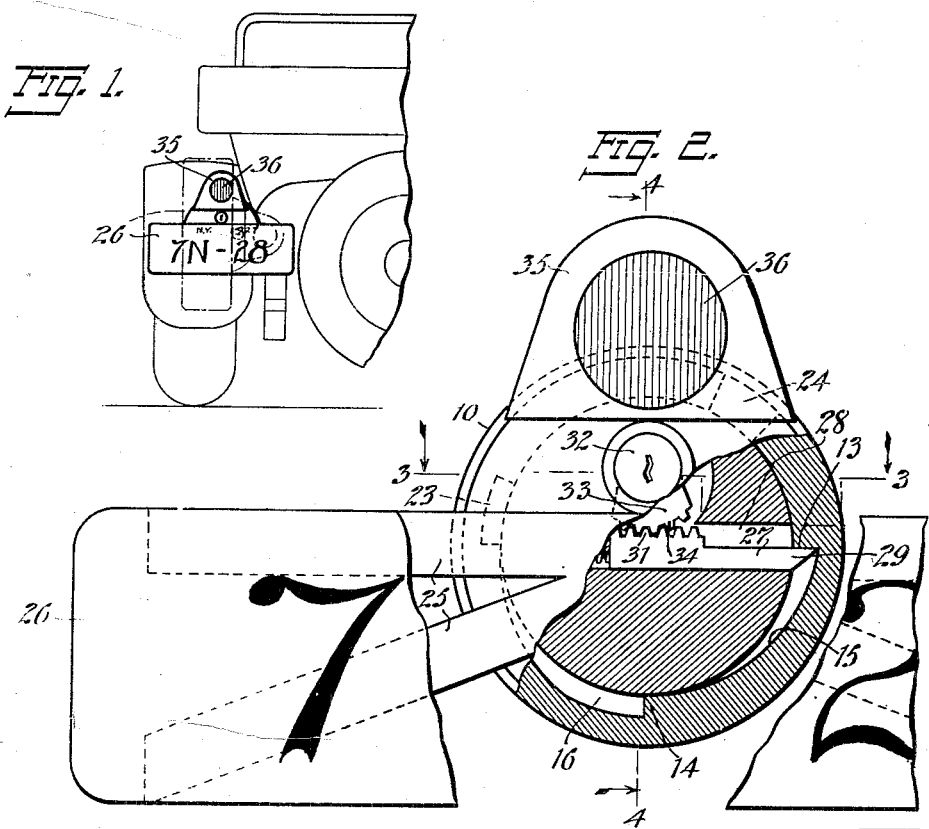
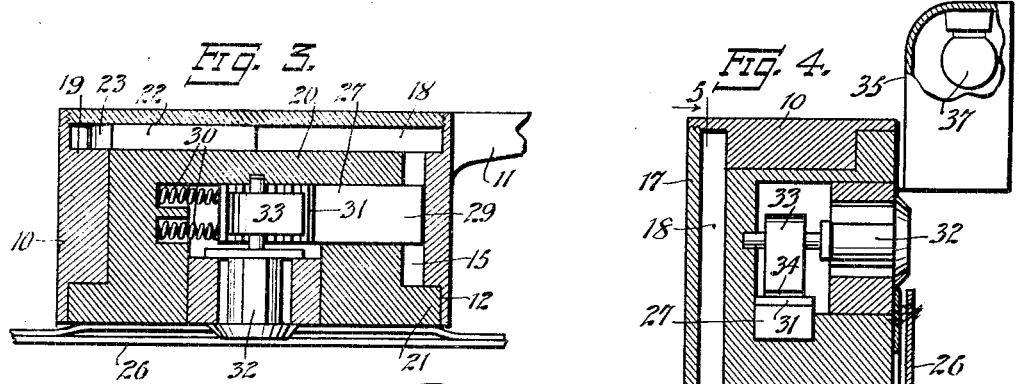
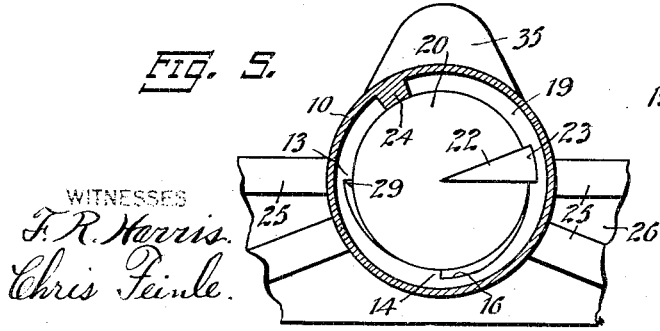
WITNESSES
F. R. Harris
Chris Feinle
INVENTOR
H. W. Johnson
BY
Munn & Co.
ATTORNEY Patented Aug. 26, 1930

1,774,378

UNITED STATES PATENT OFFICE

HERBERT W. JOHNSON, OF OGDENSBURG, NEW YORK

AUTOMOBILE LICENSE-PLATE HOLDER AND PARKING INDICATOR

Application filed September 10, 1927. Serial No. 218,823.

This invention relates to an attachment for use on an automobile for holding a license plate and for locking the license plate in an arbitrary or indicating position, as well as for holding the license plate in the usual position.

One of the objects of the present invention is to provide an element or plate which is so mounted on a part of an automobile that it may be moved to an arbitrary position to serve as a parking signal or indicator, to signify to persons within visual range thereof, that, if said element or plate is in the arbitrary position and some person is about to drive the automobile away, or is actually driving the automobile away, the attempt to drive the automobile away, or the actual driving away of the automobile, is being done by an unauthorized person.
Another and more specific object of the invention is the combination with a license plate, of a device which serves as a holder for the license plate for the usual purpose, and which includes means for changing the position of the license plate to an arbitrary signaling or indicating position, in which the indicia on the license plate will be readable and which includes means for locking the license plate in the signaling or indicating position against movement by an unauthorized person for the purpose of forestalling theft of the automobile.

With the foregoing, other objects of the invention will appear from the embodiment of the invention which by way of example is described in the following specification and illustrated in the accompanying drawings, in which—

Figure 1 is an elevation of a rear portion of an automobile equipped with the present invention, the license plate being shown in full lines in the usually horizontally disposed position, and in dot and dash lines in an arbitrary or indicating position.
Fig. 2 is an enlarged sectional elevation showing certain features of the invention.

Fig. 3 is a horizontal sectional view taken substantially on the line 3—3 of Fig. 2.

Fig. 4 is a vertical sectional view taken on the line 4—4 of Fig. 2.

Fig. 5 is a sectional view taken on the line 5—5 of Fig. 4.

The device of the present invention which is in the form of an attachment, includes a cylindrical casing 10 having formed therewith or secured thereto means in the form of a support or bracket 11 for effecting the attachment of the device in its entirety. The casing 10 has an annular recess 12 at the front, and is formed to provide shoulders 13 and 14 on the inside of the wall thereof. Said shoulders 13 and 14 are spaced substantially 90°. The wall of the casing 10 has a surface 15 which is eccentric to the longitudinal axis of the casing to provide a cam between the shoulders 13 and 14. The wall of the casing 10 is also cut away as at 16 from the shoulder 14 some distance circumferentially around the inside of the wall. The casing 10 has arranged at the back thereof a disk or plate 17 which closes the back of the cylinder. Adjacent the plate 17 the casing is formed with an annular recess 18 to provide an annular shoulder 19. The cutaway 16 opens at the opposite ends thereof respectively to the recesses 12 and 18.

Arranged for rotary movement in the casing 10 is a cylindrical element 20. The element 20 may aptly be termed a rotor. The said rotor 20 has a circular flange 21 adapted to be received in the recess 12 to properly locate the rotor and to aid in mounting it for rotary movement in the casing 10. The rotor 20 has formed on the back thereof a sector 22 adapted to be disposed in the recess 18. The sector 22 projects beyond the peripheral edge of the rotor 20 to provide a lug 23 adapted to encounter a lug 24 extending radially inward from the wall of the casing 10 in the recess 18 to limit the movement of the rotor 20 to substantially 90° in a clockwise direction. The rotor 20 is associated with the casing 10 by bringing the lug 23 in registration with the cutaway 16 adjacent the shoulder 14 and then by pushing inwardly on the rotor to engage the lug 23 with the shoulder 19.

The rotor 20 has secured thereto or formed integral therewith arms 25 with which a license plate 26 is rigidly secured. The license plate 26 is of the usual construction and has imprinted thereon the automobile license number and other usual indicia such as the abbreviation of the particular State and year.

In order to hold the rotor 20 against unintentional counter-clockwise movement and the plate 26 in a horizontally disposed position; to permit the rotor 20 and therefore the plate 26 to be moved or turned clockwise; and to releasably lock the rotor 20 against movement with the plate 26 in a vertically disposed position against movement in a counter-clockwise direction, there is provided locking means presently to be described. A locking bolt or slide 27 is arranged diametrically of the rotor 20 in a recess 28 in the rotor. The end 29 of the bolt 27 is movable into and out of engagement with the shoulders 13 and 14. The bolt 27 is under the influence of springs 30 which have a normal tendency to urge the bolt 27 radially outward with respect to the rotor 20. The bolt 27 has a series of teeth 31. A key operated lock 32 of any preferred type is arranged in a recess in the rotor 20 and is securely held in place. The said lock 32 includes a sector 33 having teeth 34 which are adapted to mesh with the teeth 31 of the bolt 27. The lock 32 is operated by a key, not shown, so as to impart rotary movement to the sector 33 to retract the bolt 27 from its normal position. When the license plate 26 is in the horizontally disposed position, the usual position, the end 29 of the bolt 27 will be in engagement with the shoulder 13 thereby preventing movement of the rotor 20 and therefore the plate 26 in a counter-clockwise direction. When it is desired to move the plate 26 to a vertically disposed position, as shown in dot and dash lines in Fig. 1, it is only necessary to take hold of the plate 26 and move it clockwise. This will cause the end 29 of the bolt 27 to ride on the cam surface 15 causing the bolt 27 to move radially inward. When the rotor 20 is turned substantially 90°, the springs 30 automatically function to project the end 29 of the bolt 27 into the cutaway 16. The rotor will now be locked against movement in a counter-clockwise direction because the end 29 of the bolt 27 will encounter the shoulder 14. It will also be apparent that at this time the lug 23 will be confronted by the lug 24 on the casing to prevent movement of the rotor 20 clockwise any appreciable distance beyond 90°. The license plate 26 in the vertically disposed position will be in unusual or arbitrary position to serve as an indicator or signal to signify to persons within visual range that the automobile has been parked. When it is desired to move the plate 26 to the horizontally disposed position it is necessary to insert the key in the lock 32 to operate the same causing movement of the sector 33, coaction of the teeth 34 and 31 and retraction of the end 29 of the bolt 27 from engagement with the shoulder 14. The end 29 of the bolt 27 will be projected automatically to encounter the shoulder 13.

When it is desired to remove the rotor 20 from the casing 10, the key is inserted in the lock 32 to operate the same to retract the locking bolt 27 so that the end 29 will clear the shoulder 13 in the movement of the rotor 20 in a counter-clockwise direction. The lug 23 on the rotor 20 may then be brought to a point at which it may pass through the cutaway 16 for the removal of the rotor 20.

The rotor 20 has connected therewith a hood or shade 35 open at the bottom and having a red lens 36. A lamp 37 is arranged within the shade 35 and serves with the lens 36 as a tail light. The lamp 37 also serves to illuminate the license plate 26 at night.

From the foregoing it will be apparent that there is combined with the license plate 26 a device which is operable for supporting the license plate in the usual horizontally disposed position, and to permit the license plate to be moved to an arbitrary or vertically disposed position to signify in accordance with the present invention that the automobile has been parked; the device including means for locking the license plate in the arbitrary position against movement by an unauthorized person to the end that theft of the automobile will be forestalled.

It is to be understood that the invention is not restricted to the precise arrangement of parts shown and described, as details of construction may be modified and rearranged without departing from the spirit of the invention, the scope of which is limited only by the terms of the appended claims.

I claim:

1. On a vehicle, the combination with a license plate, of means mounting the license plate for movement from a normal horizontally disposed position to an arbitrary vertically disposed position to indicate that the vehicle has been parked, and means for locking the license plate in the arbitrary position, the indicia on the license plate being readily readable while the license plate is in the arbitrary position.

2. On a vehicle, the combination with a license plate, of means mounting the plate for movement to change its position from a normal horizontally disposed position to an arbitrary vertically disposed position to indicate that the vehicle has been parked, locking means automatically operable to lock said plate in the arbitrary position, and separate means for unlocking the locking means to release the plate for movement to its normal position, the indicia on the license plate being readily readable while the license plate is in the arbitrary position.

3. The combination with a license plate, of a holder to which said plate is rigidly secured, means adapted to be fixedly secured for supporting the holder for rotatory movement to permit said plate to be moved from a horizontally disposed position to a vertically disposed position and vice versa, a locking bolt carried by said holder, yieldable means acting on said locking bolt to cause it to engage portions of said fixed means to prevent rotatory movement of said holder in a counter-clockwise direction, and key actuated means operable to retract said locking bolt to permit movement of said holder in a counter-clockwise direction.

4. The combination of a casing adapted to be fixedly attached, a rotor arranged in said casing, means on the rotor which coacts with means on the casing for locking the rotor against movement, and a license plate secured to said rotor exteriorly of the casing so as to be horizontally disposed when the rotor is in one position, and to be vertically disposed to then serve as a parking indicator, when the rotor is in the locked position.

5. The combination of a casing adapted to be fixedly attached, a rotor arranged in said casing, key actuated means on the rotor which coacts with means on the casing for locking the rotor against movement, and a license plate secured to said rotor exteriorly of the casing so as to be horizontally disposed when the rotor is in one position, and to be vertically disposed to then serve as a parking indicator, when the rotor is in the locked position.

6. The combination of a casing adapted to be fixedly attached, a rotor arranged in said casing, the wall of said casing being cut away on the inside, said rotor having a lug adapted to be brought into registration with said cutaway, locking means operable to prevent rotatory movement of the rotor to prevent registration of said lug with the cutaway, said locking means being operable by separate means to permit rotatory movement of the rotor to bring about registration of said lug with the cutaway to permit the removal of the rotor from the casing, and a license plate secured to said rotor.

Signed at Ogdensburg in the county of St. Lawrence and State of New York this 8th day of September, A. D. 1927.

HERBERT W. JOHNSON.